(12) United States Patent
Burch

(10) Patent No.: US 6,422,117 B1
(45) Date of Patent: Jul. 23, 2002

(54) MOLDING COPING JIG AND METHOD

(76) Inventor: Haley Burch, 1050 Hillcroft Rd., Browns Summit, NC (US) 27214

( * ) Notice: Subject to any disclaimer, the term of this patent is extended or adjusted under 35 U.S.C. 154(b) by 0 days.

(21) Appl. No.: 09/561,231

(22) Filed: Apr. 28, 2000

(51) Int. Cl.$^7$ .............................. B26D 3/02; B26D 7/00
(52) U.S. Cl. ............................ 83/761; 83/581; 83/762; 144/137; 144/216; 269/295
(58) Field of Search ................ 269/79, 37, 36, 269/38, 40, 41, 291, 292, 296, 295; 144/216, 217, 287, 137, 136.95, 154.5; 30/370, 371; 83/581, 762, 743, 746, 761, 766, 767, 13

(56) References Cited

U.S. PATENT DOCUMENTS

| | | | |
|---|---|---|---|
| 3,763,733 A | * 10/1973 | Jambor | 83/766 |
| 4,158,523 A | * 6/1979 | Schotzko | 83/761 X |
| 4,249,446 A | 2/1981 | Tallerico, Jr. | |
| 4,281,827 A | * 8/1981 | Horwath | 269/189 |
| 4,743,004 A | * 5/1988 | Kloss | 269/296 |
| 4,875,399 A | * 10/1989 | Scott et al. | 83/468.3 |
| 4,880,042 A | * 11/1989 | Schafferkotter | 144/372 |
| 5,042,346 A | * 8/1991 | McCann | 83/421 |
| 5,136,904 A | 8/1992 | Peters | |
| 5,239,905 A | 8/1993 | Dunn | |
| 5,363,732 A | 11/1994 | Heasley | |
| 5,388,334 A | 2/1995 | Halsey | |
| 5,667,001 A | 9/1997 | Sanger | |
| 5,778,951 A | * 7/1998 | Huitsing | 144/144.1 |
| 5,853,036 A | * 12/1998 | Welch | 144/154.5 |
| 6,006,641 A | 12/1999 | Fletcher | |
| 6,152,009 A | * 11/2000 | Jorgensen et al. | 83/761 |

* cited by examiner

*Primary Examiner*—Boyer Ashley
(74) *Attorney, Agent, or Firm*—John V. Stewart

(57) ABSTRACT

An inexpensive jig for holding a piece of crown molding, and guiding a hand-held jigsaw at a particular angle to aid in coping the molding. The jig has a horizontal base plate 1 and two vertical side fences 2A, 2B. A guide plate 3 is attached between the front ends of the fences, and is spaced from the base plate by a gap 5. The guide plate is oriented as if rotated through two particular angles about two respective axes from a position normal to the fences and base plate. The resulting front surface of the guide plate guides a jigsaw in the coping process. An opening 4 in the guide plate is aligned with the upper surface of the base plate, and allows molding to be placed on the base plate with an end in the opening to interfere with the jigsaw blade at a desired coping angle. First, the molding is placed inverted against a miter saw fence, and an end of the molding is cut at a 45-degree angle. Next the molding is placed in the jig, with the cut end in the opening of the guide plate. A jig saw is placed on the front surface of the guide plate, and the operator manually guides the jigsaw to follow the contour of the front surface of the molding along the miter cut line. This produces a coped end for a clean 90-degree joint in crown molding.

6 Claims, 3 Drawing Sheets

MOLDING COPING JIG AND METHOD

BACKGROUND OF THE INVENTION

1. Field of the Invention

This invention relates to jigs and guides for holding crown molding and guiding a saw to cope it.

2. Description of Prior Art

Crown molding is a strip of wood placed around the intersection between the walls and the ceiling of a room. At each corner of the room two molding strips meet at a joint that appears like the corner of a picture frame. However, the construction of this joint is not a simple 45-degree miter like a picture frame. Since the corners of a room are often not perfectly square, a simple 45-degree miter would sometimes show a gap in the joint. In addition, crown molding is often a flat strip that leans between the wall and the ceiling at a characteristic angle, unlike the molding of a picture frame.

A method of producing joints with a clean appearance in this type of molding is called coping. A first molding strip is attached along the intersection of a wall and ceiling, and its end abuts the adjacent wall. The adjoining end of a second molding strip is cut to match the contours of the first molding strip and abuts the first molding strip. Contouring the end of the second molding strip is called coping. This can be done manually with a coping saw, which has a thin blade spanning the ends of a U-shaped frame with a handle. However this is slow, difficult, and requires high skill and manual dexterity.

Numerous coping accessories and systems have been devised. However, these are often complex and expensive. They include complete powered table systems with jigs for crown molding, and hand-held power coping saws with guides for crown molding. One hand-held model (U.S. Pat. No. 5,388,334) is like a miniature band saw, having a thin endless blade that is driven around rollers in the U-shaped frame of the saw. It has guide rollers that hold the saw at a selected angle to the molding, and follow its contours. Another hand-held model (US5819420) is a jigsaw with an attached rounded guide plate that allows the saw to be held at any desired angle on the molding. These do not provide firm support of the molding.

Powered table systems include U.S. Pat. No. 5,667,001, U.S. Pat. No. 6,006,641, U.S. Pat. No. 536,732, U.S. Pat. No. 429,446, and U.S. Pat. No. 5,136,904. Each of these provides a table with a jig for holding the coping, and a movable frame mounted on the table holding a power saw that follows the contour of the coping. These are complex compared to the present invention.

SUMMARY OF THE INVENTION

The main objective of this invention is provision of an inexpensive molding jig and a method for coping crown molding with a standard miter saw and a jigsaw that produces professional results with minimal training and skill.

This objective is met with a two-step method using a standard miter saw to make a first crosscut, and an inexpensive jig that holds crown molding and guides a hand-held jigsaw in a coping operation. The jig has a horizontal base plate 1 and two vertical side fences 2A, 2B. A guide plate 3 is attached between the front ends of the fences, and is spaced from the base plate by a gap 5. The guide plate is oriented as if rotated through two particular angles about two respective axes from a position normal to the fences and base plate. The resulting front surface of the guide plate guides a jigsaw in the coping process. An opening 4 in the guide plate is aligned with the upper surface of the base plate, and allows molding to be placed on the base plate with an end in the opening to interfere with the jigsaw blade at a desired coping angle. First, the molding is placed inverted against a miter saw fence, and an end of the molding is cut at a 45-degree angle. Next the molding is placed in the jig, with the cut end in the opening of the guide plate. A jig saw is placed on the front surface of the guide plate, and the operator manually guides the jigsaw to follow the contour of the front surface of the molding along the miter cut line. This produces a coped end resulting in a clean 90-degree joint in crown molding.

REFERENCE NUMBERS

Figure 1:
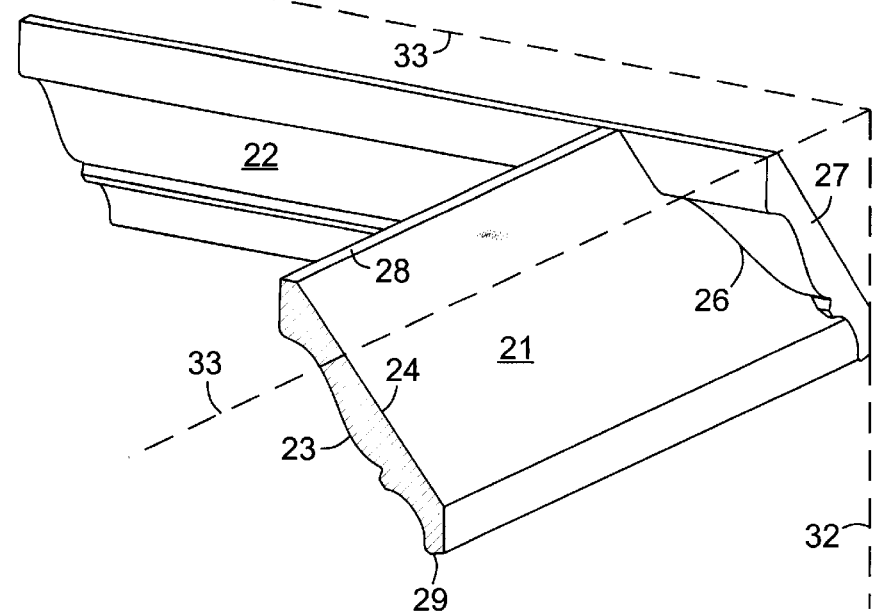
FIG. 1 is a perspective view of a 90-degree corner joint of crown molding as installed in a corner between a wall and ceiling of a room.

A. Characteristic installed angle between back of crown molding and wall
B. Angle of guide plate from vertical as rotated about a horizontal axis.
C. Angle of guide plate from a plane normal to base plate and fences, as rotated about a vertical axis.
1. Base plate of jig
2A. First fence of jig
2B. Second fence of jig
2C. Angled cutout in second fence for clearance of jigsaw blade
3. Guide plate
4. Opening in guide plate
5. Gap between front of base plate and guide plate for clearance of jigsaw blade
15. Mitersawtable
16. Miter saw fence
20. Visible joint line between two pieces of crown molding in a 90-degree inside corner.
21. First piece of molding
22. Second piece of molding
23. Contoured front surface of molding
24. Flat back surface of molding
26. Coped (contoured) butt joint between first and second pieces of molding
27. Flat end of second piece of molding
28. Top side of molding
29. Bottom side of molding
30. Ceiling
31. Wall
32. Intersection of two walls 33. Intersection of ceiling and wall
40. Jigsaw or scroll saw
41. Foot of jigsaw
42. Blade of jigsaw

DETAILED DESCRIPTION

Figure 4:
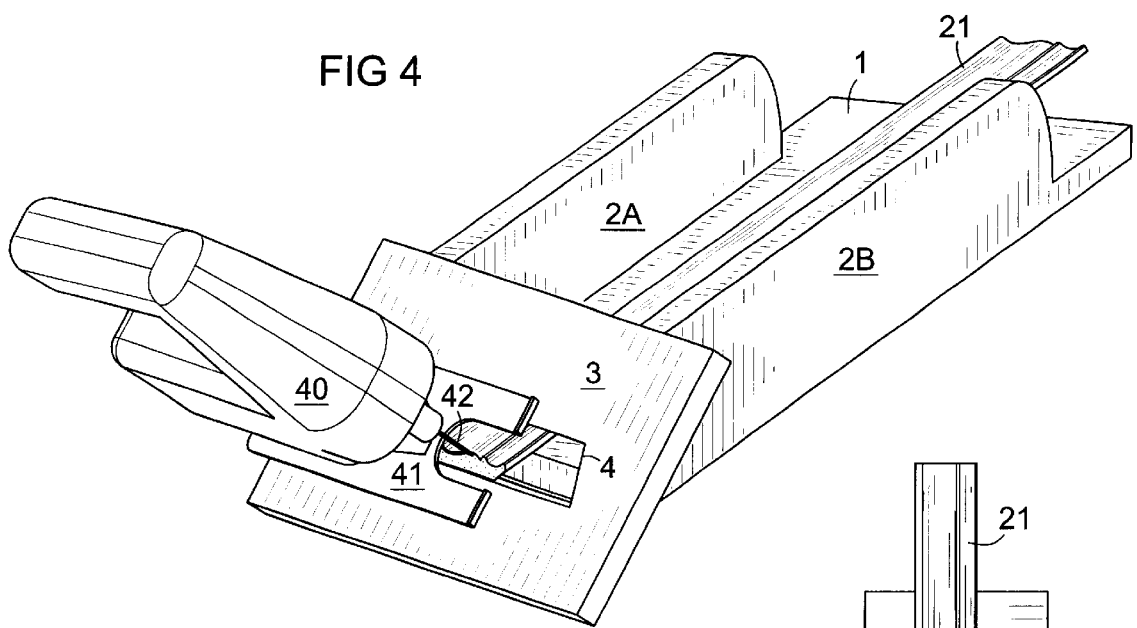
FIG. 4 is a perspective view of the coping jig in operating position.
Figure 5:
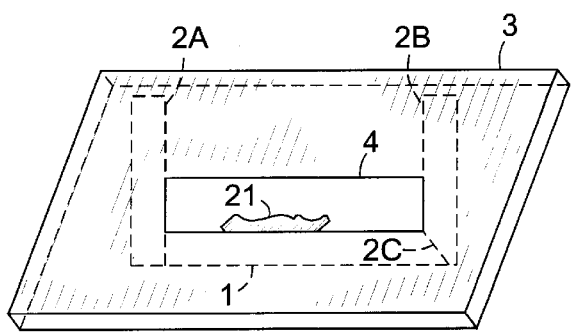
FIG. 5 is a front view of FIG. 4, less the jigsaw.

The jig shown in FIG. 4 holds molding 21 to be coped, and it guides a standard jigsaw along a plane that allows the operator to concentrate on following the contour of the molding with the saw blade 42. The jig has a horizontal base plate 1 with first and second vertical fences 2A and 2B on each side. The front end of the fences hold a guide plate 3 at an angle that guides a jigsaw 40 in the coping process. The guide plate has an opening 4 aligned with the upper surface of the base plate. A piece of molding 21 is placed on its back 24 on the base plate, with the end to be coped inserted into the opening in the guide plate. The guide plate is oriented at a particular angle relative to the molding that produces a desirable coping angle of the saw blade. A gap is provided between the base plate and the guide plate for jigsaw blade clearance. A cutaway 2C as seen in FIG. 5 should be provided in the longer fence 2B for the same purpose. The jig can be made of any appropriate structural material, such as plastic, aluminum, steel, wood, or particle board. The preferred material is plastic.

Figure 8:
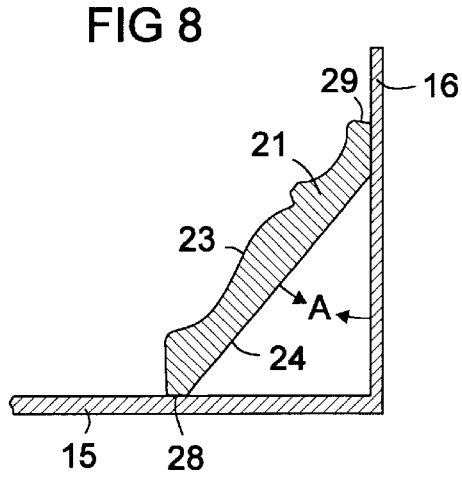
FIG. 8 is a cross sectional view of molding placed inverted on a miter saw table for the first cut at 45 degrees.
Figure 9:
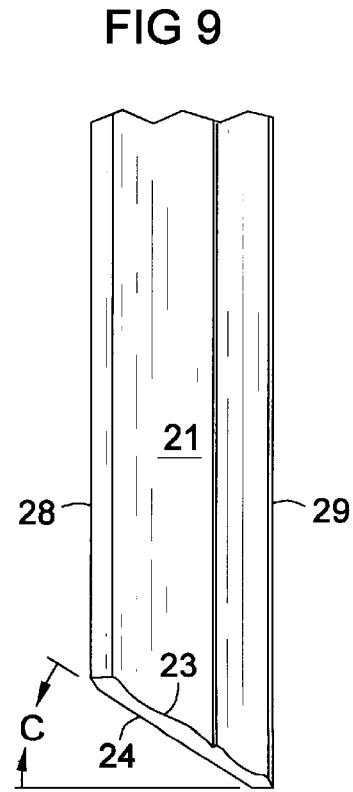
FIG. 9 is a top view of molding placed on its back after the first cut.

Prior to coping, a first cut is made across the end of the molding in a miter saw. To produce this cut, the molding is placed on the miter saw table inverted. The top side 28 of the molding is placed on the table, and the bottom side 29 of the molding leans against the fence of the miter saw, as shown in FIG. 8. The molding leans against the fence at the characteristic installed angle between the back of the molding and the wall, except inverted. The miter saw head is positioned at a 45-degree angle headed toward the molding, so that the bottom side 29 of the molding will be the longer side or toe of the cut, and the crosscut is made. This produces the proper final cut at the contoured front surface 23 of the molding.

Figure 3:
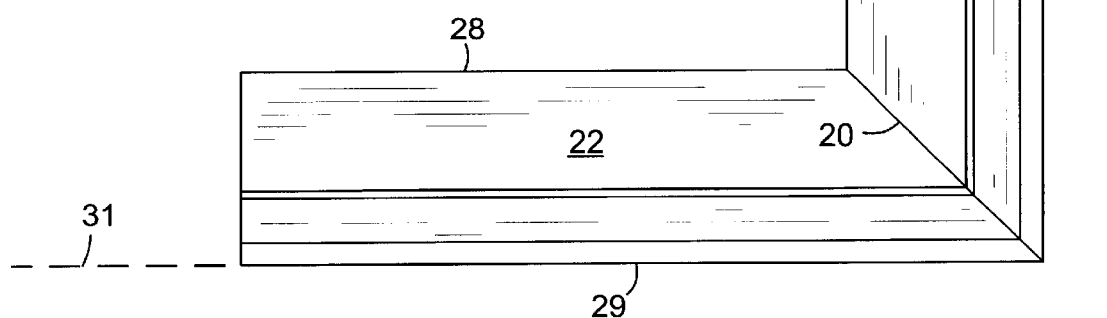
FIG. 3 is a bottom view of FIG. 1, showing that the intersection line 20 from this angle is 45 degrees.

FIG. 3 shows that the intersection line 20 between the two pieces of molding is 45 degrees as seen from below. This is true no matter what angle A is used between the molding and the wall, and no matter what is the contour of the front surface 23 of the molding. This is why the first cut in the miter saw is always 45 degrees when the molding is inverted on the miter saw table.

Figure 2:
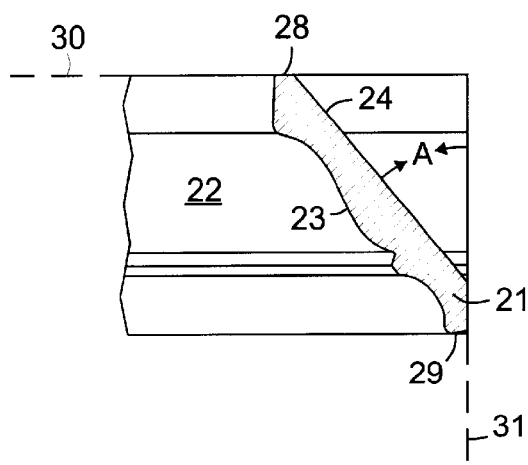
FIG. 2 is a view of FIG. 1 aligned with a first piece 21 of the molding, showing the characteristic angle A between the molding and the wall.

After the first cut, the only portion of the cut that is accurate is the cut-line along the front surface of the molding. The cut end must now be coped by following this line with a coping saw while undercutting the end of the molding to produce a negative image of the contour of the front surface. This negative shape will now fit against the front surface of the adjoining molding in a 90-degree joint as shown in FIGS. 1–3 when both pieces are installed at their characteristic angle against a wall.

Figure 6:
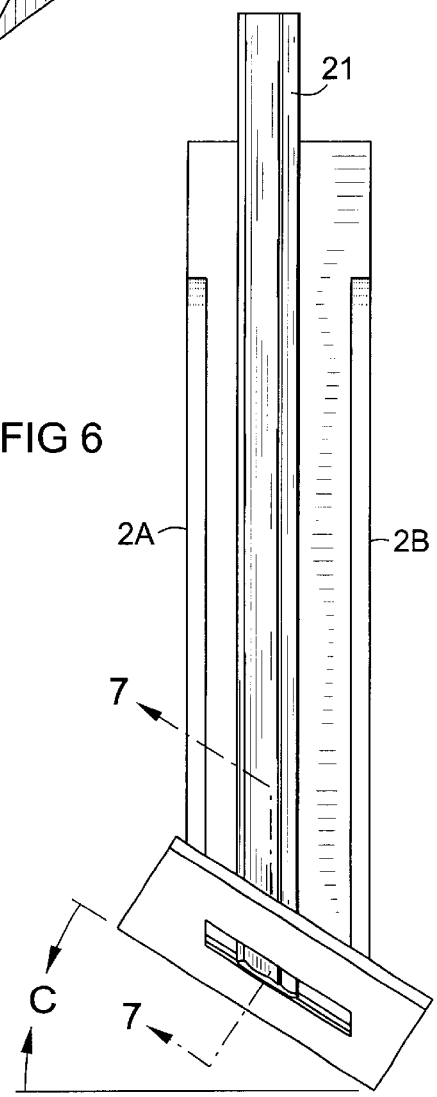
FIG. 6 is a top view of FIG. 4, less the jigsaw.

After the first cut is made at 45 degrees with the molding leaning against the miter saw fence upside-down, the resulting angle C across the end of the molding is C=ArcTan(Sin A), where A is the characteristic installed angle of divergence between the back of the molding and the wall. For example, if the molding leans from the wall at an angle 40 degrees, the miter saw cut will produce an end angle C=ArcTan(Sin 40)=32.7 degrees from square. The guide plate is oriented at this angle, as seen in the top view of FIG. 6. This allows the jigsaw to follow the end of the molding during coping. The following table provides examples of angles A and C.

| ANGLE A | ANGLE C |
|---------|---------|
| 30      | 26.6    |
| 40      | 32.7    |
| 50      | 37.5    |
| 60      | 40.9    |

Figure 7:
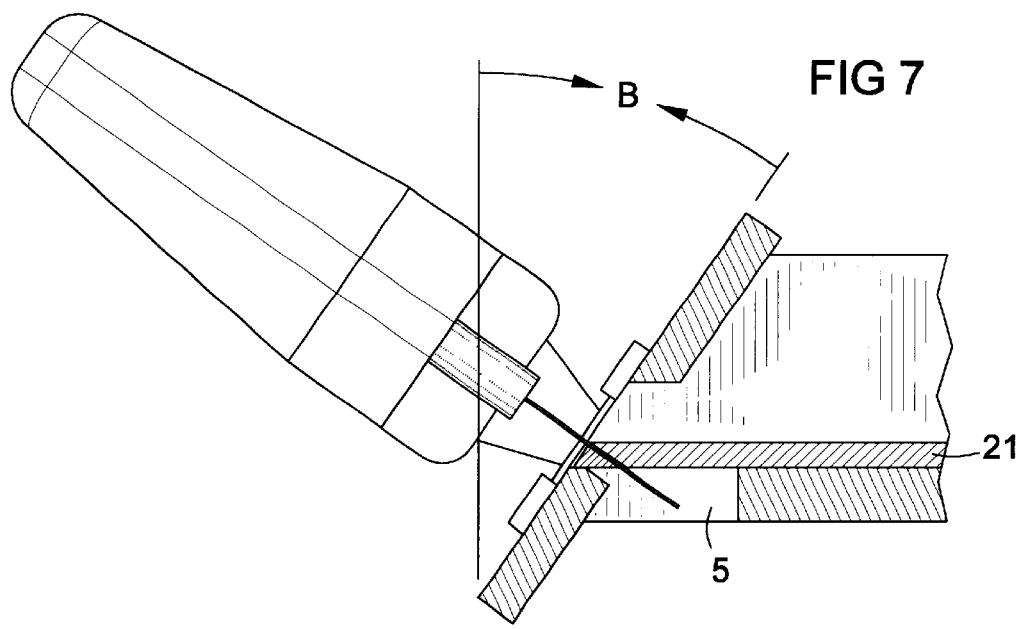
FIG. 7 is a right side sectional view of the front end of the molding jig of FIG. 4 taken along line 7–7 in FIG. 6.

The guide plate is also angled about a horizontal axis as shown in FIG. 7 so the jig saw undercuts the end of the molding at a suitable angle to avoid interference with the curves of the adjacent molding. This angle B need not be exact, since only the front line 20 of the cut is visible in the final joint. If angle B is too small, the undercut is excessive, and a gap will occur at the back line 26 of the joint, but this is not visible. However, if angle B is too large, the undercut is insufficient to avoid interference with the contoured front surface of the adjoining molding, and a gap will be visible along line 20 in the joint. An angle B of 35 degrees as shown in FIG. 7 is suitable for crown molding with a characteristic angle A of about 40 degrees. Angle B can be increased or decreased if the characteristic angle A of the molding is substantially less than or greater than 40 degrees respectively.

If desired, one or both guide plate angles can be made adjustable with appropriate mounting hardware connecting the guide plate to the fences, such as a hinge or compound hinge on one side and slidable tongues in brackets with set screws on the other side.

If the same side of each corner of crown molding is always coped, then only one coping jig is needed. For example, if the right-hand piece of molding is always coped, the jig is made as shown in the drawings. However, if the left-hand piece of molding is to be coped, then the jig is a lateral mirror image of the drawings, in which the guide plate angle C is reversed so that the right side of the guide plate is closest to the base plate. The first cut on molding to be coped for the right side of a corner is done on the left side of the miter saw. The first cut on molding to be coped for the left side of a corner is done on the right side of the miter saw.

Although the present invention has been described herein with respect to preferred embodiments, it will be understood that the foregoing description is intended to be illustrative, not restrictive. Modifications of the present invention will occur to those skilled in the art. All such modifications that fall within the scope of the appended claims are intended to be within the scope and spirit of the present invention.

I claim:

1. A molding coping accessory, comprising:
   a flat horizontal base plate, having first and second sides, front and back ends;
   first and second vertical fences, both having front and back ends, the first and second vertical fences extending upward along at least a portion of the first and second sides of the base plate respectively;
   a guide plate attached between the front ends of the fences, having a top edge, a bottom edge, and first and second side edges;
   the guide plate having a planar surface facing away from the base plate, the planar surface fixed at an angle with respect to a reference plane normal to both the base plate and the fences, the planar surface inclined at an angle B of 25–45 degrees from said reference plane about a horizontal axis, with the top edge of the guide plate inclined toward the base plate, and the planar surface inclined at an angle C of 26–41 degrees from said reference plane about a vertical axis, with the first side of the guide plate inclined toward the base plate.

2. The molding coping accessory of claim 1 wherein angle C is determined by the formula, ArcTan(Sin A), plus or minus 5 degrees, where A is a characteristic installation angle of divergence between a given type of crown molding and a vertical wall.

3. The molding coping accessory of claim 2, wherein angle B is between 30 and 40 degrees.

4. A molding coping accessory, comprising:

a horizontal base plate having an upper surface, front and back ends, and first and second sides;

a jigsaw guide plate having first and second sides, top and bottom edges, and a flat front surface;

first and second fences attached between respective sides of the base plate and the guide plate, holding the guide plate at a predetermined distance and orientation apart from the front end of the base plate;

the front surface of the guide plate inclined at an angle B between 25 and 45 degrees from vertical, with the top edge of the guide plate inclined toward the base plate;

the front surface of the guide plate further inclined at an angle C between 26 and 41 degrees about a vertical axis from a plane normal to the first side of the base plate, with the first side of the guide plate inclined toward the base plate; and the guide plate having an opening aligned with the upper surface of the base plate;

whereby a piece of molding is placed on the base plate, with one end of the molding inserted into the opening of the guide plate, and a jigsaw is placed against the front surface of the guide plate with its blade inserted into the opening of the guide plate for coping the one end of the molding.

5. The molding coping accessory of claim 4, wherein angle C is ArcTan(Sin A), plus or minus 5 degrees, where A is a characteristic installation angle of divergence between a given type of crown molding and a vertical wall.

6. The molding coping accessory of claim 5, wherein angle B is between 30 and 40 degrees.

* * * * *